April 12, 1966 R. K. WILLARDSON ETAL 3,246,225
POWER SUPPLY CIRCUITS
Original Filed June 30, 1955

INVENTOR.
Robert K. Willardson
Albert C. Beer
BY
Gray, Mase
& Dunson
ATTORNEYS.

United States Patent Office 3,246,225
Patented Apr. 12, 1966

3,246,225
POWER SUPPLY CIRCUITS
Robert K. Willardson, Arcadia, Calif., and Albert C. Beer, Columbus, Ohio, assignors, by mesne assignments, to The Battelle Development Corporation, Columbus, Ohio, a corporation of Delaware
Application Apr. 13, 1959, Ser. No. 806,184, which is a division of application Ser. No. 519,070, June 30, 1955, now Patent No. 2,889,492, dated June 2, 1959. Divided and this application July 16, 1962, Ser. No. 214,780
3 Claims. (Cl. 321—2)

This is a division of application Serial No. 806,184, filed April 13, 1959, now abandoned, which was a division of application Serial No. 519,070, filed June 30, 1955, now U.S. Patent 2,889,492, patented June 2, 1959.

This invention relates to power supply circuits, and particularly to circuits in which a direct voltage is converted into an alternating voltage.

In accordance with the present invention, a typical power supply circuit for use with a direct voltage source comprises a first magnetoresistance element, a transformer, the first magnetoresistance element and a first winding of the transformer being connected to the direct voltage source, means for providing a varying magnetic field across the first magnetoresistance element, whereby an alternating voltage is provided across a second winding of the transformer, a second magnetoresistance element connected to the second winding of the transformer, and means for providing across the second magnetoresistance element a varying magnetic field that has a maximum strength when the alternating voltage across the second winding of the transformer is at a peak in one direction and has a minimum strength when the alternating voltage is at a peak in the opposite direction.

Figure 2:
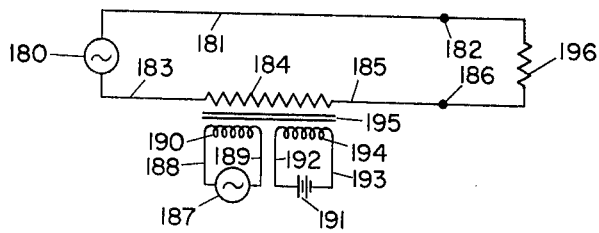
FIG. 2 is a schematic diagram of a rectifier circuit similar to the rectifier portion of the circuit of FIG. 1.

FIG. 2 illustrates the basic circuit of a magnetoresistance rectifier. One terminal of an A.-C. voltage source 180 is connected by a wire 181 to an output terminal 182. The other terminal of the A.-C. voltage source 180 is connected by a wire 183 to one end of a magnetoresistance element 184. The other end of the magnetoresistance element 184 is connected by a wire 185 to the other output terminal 186. An A.-C. voltage source 187 is connected by wires 188, 189 across a coil 190. A D.-C. voltage source 191 is connected by wires 192, 193 across a coil 194. The coils 190 and 194 have a core 195 of iron or other suitable ferromagnetic material so constructed and positioned as to provide a magnetic field across the magnetoresistance element 184. A load 196 is connected across the output terminals 182, 186. The A.-C. voltage source 187 is operated in such manner as to provide a magnetic field that has the same frequency as, and is either in phase with or 180° out of phase with, the A.-C. voltage supplied by the A.-C. voltage source 180.

Figure 3:
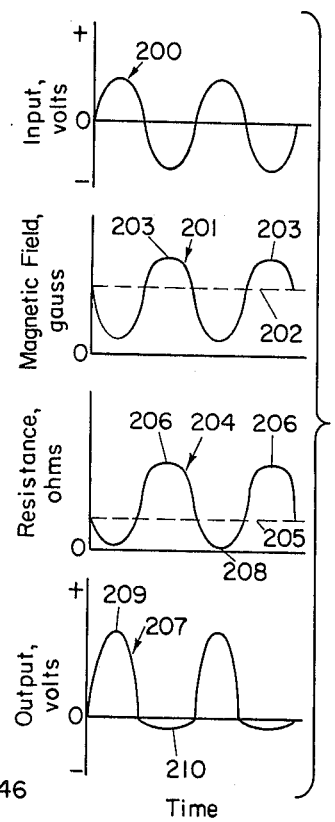
FIG. 3 is a graph in rectangular coordinates of input voltage, magnetic field, resistance, and output voltage as functions of time in the circuit of FIGS. 2 and 4.

FIG. 3 illustrates the operation of the circuit of FIG. 2. The curve 200 represents the A.-C. input voltage provided by the A.-C. voltage source 180. The curve 201 represents the magnetic field across the magnetoresistance element 184. The dashed line 202 indicates the magnetic field provided by the coil 194 connected to the D.-C. voltage source 191, while the curve 201 indicates the instantaneous magnetic field provided by the coil 194 and by the coil 190 connected to the A.-C. voltage source 187. Preferably tthe ferromagnetic core 195 of the coils 190, 194 is driven to saturation during a large portion of the half cycle to provide maximum resistance in the magnetoresistance element 184 during a large portion of the half cycle. For such operation the peaks of the magnetic field curve 201 are flattened, as is indicated at 203—203. The curve 204 represents the resistance of the magnetoresistance element 184. The dashed line 205 indicates the resistance of the magnetoresistance element 184 obtained with the magnetic field provided by the coil 194 connected to the D.-C. voltage source 191, as indicated by the dashed line 202, while the curve 204 indicates the instantaneous resistance of the magnetoresistance element 184 obtained with the magnetic field provided by the coil 194 and by the coil 190 connected to the A.-C. voltage source 187, as indicated by the curve 201. Because of the saturation of the ferromagnetic core 195 during a large portion of the half cycle, the peaks of the resistance curve 204 are flattened, as is indicated at 206—206. The curve 207 represents the output voltage across the load 196 where the load 196 is a pure resistance. Where the load 196 is a complex load the output voltage curve 207 is the same but is shifted along the time axis because of the phase shift in the load 196. The ratio of maximum resistance 206 to minimum resistance 208, the magnetoresistance ratio, is the ratio of reverse to forward resistance of the magnetoresistance rectifier circuit of FIG. 2, and is the same as the ratio of the peak forward voltage 209 to the peak reverse voltage 210.

Various modifications can be made in the circuit of FIG. 2. A single coil can be used in place of the two coils 190 and 194, the single coil being supplied with alternating current and direct current from sources either in series or in parallel.

Figure 4:
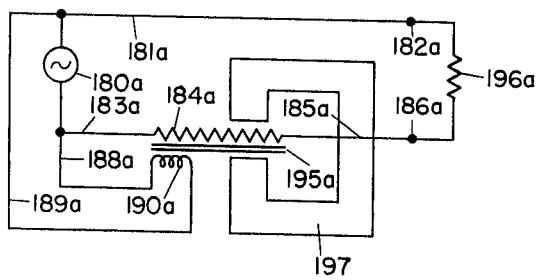
FIG. 4 is a schematic diagram of a modification of the rectifier circuit of FIG. 2.

FIG. 4 illustrates a modification of the circuit of FIG. 2. All of the components indicated by the reference numerals 180a–196a in FIG. 4 correspond respectively to the components having the same reference numerals without the subscripts in FIG. 2. The circuit of FIG. 4 is the same as the circuit of FIG. 2 except that in FIG. 4 the A.-C. voltage source 187 is omitted and the coil 190a is connected by the wires 188a, 189a across the same A.-C. voltage source 180a that provides the input voltage to the circuit, and except that the coil 194, the D.-C. voltage source 191 and the connecting wires 192, 193 are omitted in the circuit of FIG. 4 and are replaced by a permanent magnet 197, which provides the same magnetic field, as indicated by the dashed line 202 of FIG. 3.

The operation of the circuit of FIG. 4 is illustrated in FIG. 3, and is the same as the operation of the circuit of FIG. 2. The phase relations are such that when the A.-C. input voltage 200 reaches a maximum, the magnetic field 201 and the resistance 204 of the magnetoresistance element 184 are at a minimum, and when the A.-C. input voltage 200 reaches its maximum in the reverse direction the magnetic field 201 and the resistance 204 are at their maximum values.

In the circuits of FIG. 2 and FIG. 4 the wave form of the rectified output 207 depends upon the amount of saturation of the ferromagnetic core 195 or 195a. The portion of the half cycle during which the core 195 or 195a is saturated is an important variable in the design of a magnetoresistance circuit for rectification. A unique and advantageous characteristic of the magnetoresistance rectifier circuit of FIG. 2 is the characteristic that the forward resistance and the rectification ratio are the same for any input voltage. Magnetoresistance rectifier circuits of the type illustrated in FIG. 2 can therefore be used advantageously for rectifying small signals, as well as for rectifying high voltage, high current density inputs.

Figure 1:
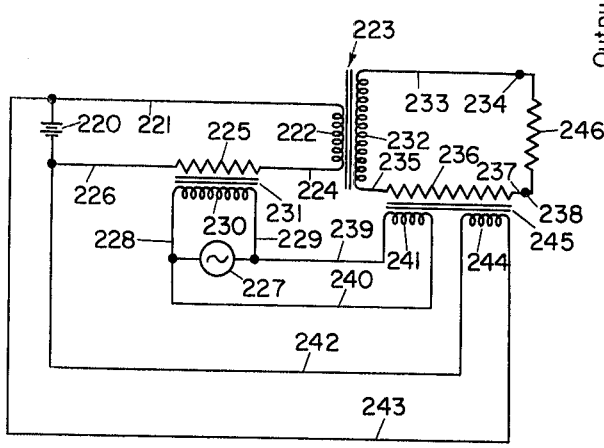
FIG. 1 is a schematic diagram of a power supply according to the present invention.

FIG. 1 illustrates a D.C. power supply circuit in which a direct voltage is converted into an alternating voltage that is stepped up and then rectified. One terminal of a D.C. voltage source 220 is connected by a wire 221 to one end of the primary winding 222 of a step-up transformer 223. The other end of the primary winding 222 is connected by a wire 224 to one end of a first magnetoresistance element 225. The other end of the magnetoresistance element 225 is connected by a wire 226 to the other terminal of the D.C. voltage source 220. An A.C. voltage source 227 is connected by wires 228, 229 across a coil 230 having a core 231 of iron or other suitable ferromagnetic material so constructed and positioned as to provide a magnetic field across the magnetoresistance element 225. One end of the high-voltage secondary winding 232 of the transformer 223 is connected by a wire 233 to an output terminal 234. The other end of the secondary winding 232 is connected by a wire 235 to one end of a second magnetoresistance element 236. The other end of the magnetoresistance element 236 is connected by a wire 237 to the other output terminal 238. The A.C. voltage source 227 is connected by wires 239, 240 across a coil 241. The D.C. voltage source 220 is connected by wires 242, 243 across a coil 244. The coils 241 and 244 have a core 245 of iron or other suitable ferromagnetic material so constructed and positioned as to provide a magnetic field across the magnetoresistance element 236. A load 246 is connected across the output terminals 234, 238.

The D.C. voltage source 220 provides a current through the primary winding 222 of the transformer 223 and through the magnetoresistance element 225. The alternating current provided by the A.C. voltage source 227 through the coil 230 provides a continuously varying magnetic field across the first magnetoresistance element 225 and thus continuously varies the resistance of the element 225. The continuous variation in the resistance of the element 225 provides an opposite continuous variation in the current through the magnetoresistance element 225 and the primary winding 222 of the transformer 223. A high A.C. voltage is thus provided across the secondary winding 232 of the transformer 223. The rectifier portion of the circuit of FIG. 1 operates in the same manner as the circuit of FIG. 2, as is illustrated in FIG. 3. The curve 200 in FIG. 3 represents the A.C. voltage provided across the secondary winding 232 of the transformer 223. The curve 201 represents the magnetic field across the magnetoresistance element 236. The dashed line 202 indicates the magnetic field provided by the coil 244 connected to the D.C. voltage source 220, while the curve 201 indicates the instantaneous magnetic field provided by the coil 244 and by the coil 241 connected to the A.C. voltage source 227. Since the A.C. voltage source 227 connected across the coil 241 is the same A.C. voltage source that is connected across the coil 230 that varies the resistance of the magnetoresistance element 225, the magnetic field across the magnetoresistance element 236 is either in phase with or 180 degrees out of phase with the A.C. voltage across the secondary winding 232 of the transformer 223. Preferably, the ferromagnetic core 245 of the coils 241, 244 is driven to saturation during a large portion of the half cycle to provide maximum resistance in the magnetoresistance element 236 during a large portion of the half cycle. For such operation the peaks of the magnetic field curve 201 are flattened, as is indicated at 203—203. The curve 204 represents the resistance of the magnetoresistance element 236. The dashed line 205 indicates the resistance of the magnetoresistance element 236 obtained with the magnetic field provided by the coil 244 connected to the D.C. voltage source 220, as indicated by the dashed line 202, while the curve 204 indicates the instantaneous resistance of the magnetoresistance element 236 obtained with the magnetic field provided by the coil 244 and by the coil 241 connected to the A.C. voltage source 227, as indicated by the curve 201. Because of the saturation of the ferromagnetic core 245 during a large portion of the half cycle, the peaks of the resistance curve 204 are flattened, as is indicated at 206—206. The curve 207 represents the output voltage across the load 246 where the load 246 is a pure resistance. Where the load 246 is a complex load, the output voltage curve 207 is the same but is shifted along the time axis because of the phase shift in the load 246. The ratio of maximum resistance 206 to minimum resistance 208, the magnetoresistance ratio, is the ratio of reverse to forward resistance of the rectifier portion of the circuit of FIG. 1, and is the same as the ratio of the peak forward voltage 209 to the peak reverse voltage 210.

The load 246 in the circuit of FIG. 1, and the loads 196 and 196a of FIG. 2 and FIG. 4, respectively, may, of course, include conventional filters for the D.C. output.

While the forms of the invention herein disclosed constitute preferred embodiments, it is not intended herein to describe all of the possible equivalent forms or ramifications of the invention. It will be understood that the words used are words of description rather than of limitation, and that various changes may be made without departing from the spirit or scope of the invention herein disclosed.

What is claimed is:

1. A power supply circuit for use with a direct voltage source comprising a first magnetoresistance element, a transformer, said first magnetoresistance element and a first winding of said transformer being connected to said direct voltage source, means for providing a varying magnetic field across said first magnetoresistance element, whereby an alternating voltage is provided across a second winding of said transformer, a second magnetoresistance element connected to said second winding of said transformer, and means for providing across said second magnetoresistance element a varying magnetic field that has a maximum strength when said alternating voltage across said second winding of said transformer is at a peak in one direction and has a minimum strength when said alternating voltage is at a peak in the opposite direction.

2. A power supply circuit for use with a direct voltage source comprising a first magnetoresistance element, a transformer, said first magnetoresistance element and a first winding of said transformer being connected to said direct voltage source, a first electromagnet positioned to provide a magnetic field across said first magnetoresistance element, means for supplying alternating current to said electromagnet, whereby an alternating voltage is provided across a second winding of said transformer, a second magnetoresistance element connected to said second winding of said transformer, means for providing a magnetic field across said second magnetoresistance element, and means for reducing said magnetic field during one half cycle of the alternating voltage across said second winding of said transformer and for increasing said magnetic field during the other half cycle of said alternating voltage.

3. A power supply circuit for use with a direct voltage source comprising a first magnetoresistance element, a transformer, said first magnetoresistance element and a first winding of said transformer being connected to said direct voltage source, a first electromagnet positioned to provide a magnetic field across said first magnetoresistance element, means for supplying alternating current to said electromagnet, whereby an alternating voltage is provided across a second winding of said transformer, a second magnetoresistance element connected to said second winding of said transformer, means including an electromagnet positioned to provide a magnetic field across said second magnetoresistance element, and means for providing across a winding of said electromagnet an alternating voltage of the same frequency as, and either in phase with or 180 degrees out of phase with, the alternating voltage across said second winding of said transformer.

References Cited by the Examiner
UNITED STATES PATENTS

| | | | |
|---|---|---|---|
| 543,843 | 8/1895 | Biggar | 323—94 |
| 2,226,846 | 12/1940 | Clark | 338—32 |
| 2,329,511 | 9/1943 | Christensen | 252—518 |
| 2,464,807 | 3/1949 | Hansen | 323—94 |
| 2,490,825 | 12/1949 | Mochel | 252—518 |
| 2,541,093 | 2/1951 | Page | 321—8 |
| 2,545,369 | 3/1951 | Millar | 324—45 X |
| 2,634,393 | 4/1953 | Wu et al. | 321—8 |
| 2,649,569 | 8/1953 | Pearson | 324—46 |
| 2,707,223 | 4/1955 | Hollmann | 338—32 |
| 2,762,008 | 9/1956 | Gordon | 321—45 X |
| 2,906,945 | 9/1959 | Weiss | 324—45 |

LLOYD McCOLLUM, *Primary Examiner.*

RALPH D. BLAKESLEE, *Examiner.*

Dedication 3,246,225.—*Robert K. Willardson*, Arcadia, Calif., and *Albert C. Beer*, Columbus, Ohio. POWER SUPPLY CIRCUITS. Patent dated Apr. 12, 1966. Dedication filed May 7, 1973, by the assignee, *The Battelle Development Corporation*.

Hereby dedicates to the People of the United States the entire remaining term of said patent.

[*Official Gazette October 30, 1973.*]